United States Patent

[11] 3,551,675

[72] Inventors Park H. Miller, Jr.
  Del Mar;
  William L. Whittemore, La Jolla, Calif.
[21] Appl. No. 657,843
[22] Filed Aug. 2, 1967
[45] Patented Dec. 29, 1970
[73] Assignee Gulf Energy & Environmental Systems, Inc.
  San Diego, Calif.
  a corporation of Delaware. by mesne assignments

[54] METHOD AND APPARATUS FOR MODULATING THE DENSITY OF A BEAM OF PARTICLES AND DETERMINING THE VELOCITY DISTRIBUTION OF THE PARTICLES
13 Claims, 10 Drawing Figs.

[52] U.S. Cl. ................................................. 250/83.1
[51] Int. Cl. ................................................. G01t 3/00
[50] Field of Search ................................. 250/41.3, 83.1; 313/61

[56] References Cited
UNITED STATES PATENTS
2,950,393 11/1960 Southward .................. 250/83.1
2,524,379 10/1950 Fermi .......................... 250/83.1

Primary Examiner—Rodney D. Bennett
Assistant Examiner—Charles E. Wands
Attorney—Anderson, Luedeka, Fitch, Even & Tabin ABSTRACT: To determine the velocity distribution of particles, such as neutrons from a reactor, a beam of the particles is modulated at a first point by varying the particle density in accordance with an applied signal. The particles are detected at a subsequent point in the beam to produce a series of pulses corresponding to the detected particles, the time distribution of which is related to the applied signal and to the velocity distribution of the particles. The beam may be modulated cyclically and the detection pulses occurring at respective times in the cycle may be accumulated. The resulting signals may then be demodulated, using some function of the applied signal, for example by a correlation technique, to produce a signal indicative of the distribution of particle velocities. The particle density may be varied by apparatus comprising a series of absorbers and transparent bodies movable alternately across the beam.

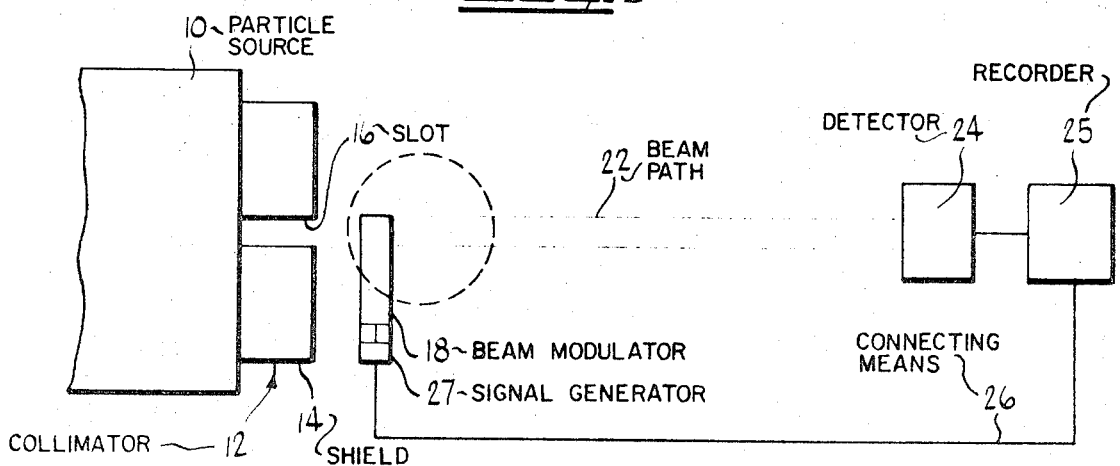
Fig. 1
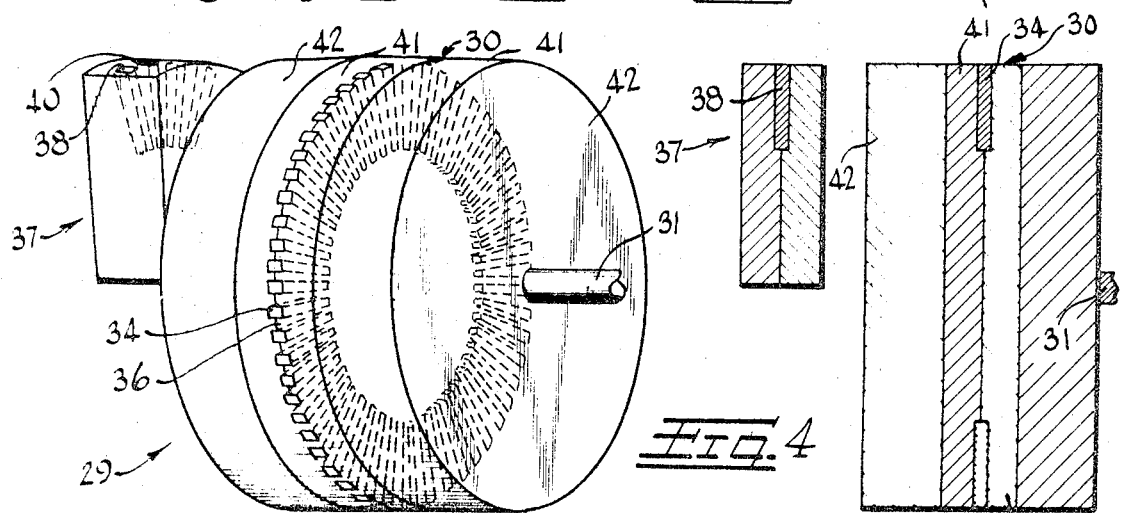
INVENTORS
PARK H. MILLER JR.
WILLIAM L. WHITTEMORE
BY Anderson, Luedeka, Fitch, Even & Tabin
ATTORNEYS

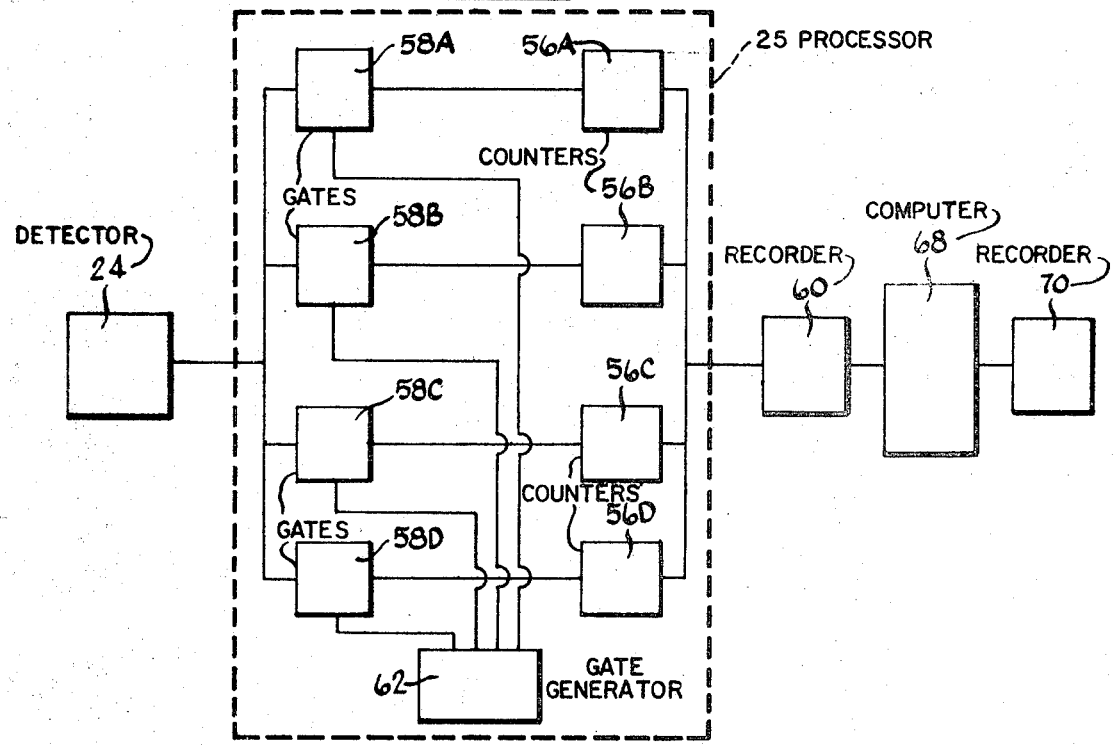
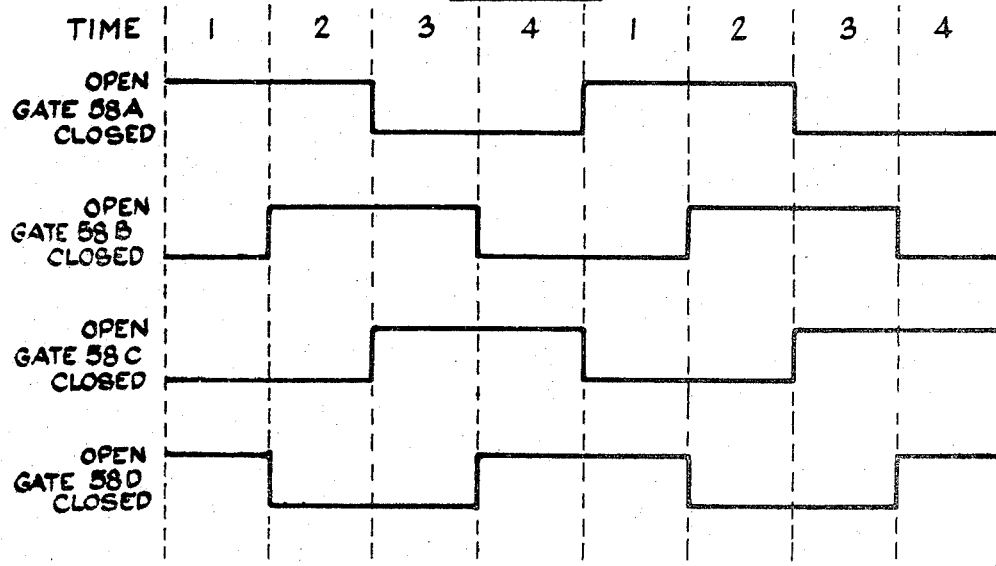

3,551,675

METHOD AND APPARATUS FOR MODULATING THE DENSITY OF A BEAM OF PARTICLES AND DETERMINING THE VELOCITY DISTRIBUTION OF THE PARTICLES

This invention relates generally to methods of and apparatus for measuring particle velocities and, more particularly, to an improved method and apparatus for determining the distribution of velocities of a plurality of particles.

Measurement of the velocities of particles, particularly subatomic particles, is useful in a variety of applications. For example, in determining the nuclear absorption or scattering cross section of a material, which varies with the energy of the particles incident on the material, the velocity distribution of a large number of particles incident on a sample of the material under investigation and having a suitable range of velocities is compared with the velocity distribution of the emerging particles to determine the cross section of the material as a function of the velocity of the incident particles.

One such method which has been used to determine neutron cross sections involves the use of a neutron source which produces short bursts of neutrons having a suitable range of velocities. The times of flight of the neutrons in the bursts from the source to a point which is a known distance from the source are indicative of the neutron velocities. In a specific apparatus a narrow slot through the shielding wall of a nuclear reactor produces a collimated beam of neutrons of various energies. The beam is broken periodically by a neutron chopper comprised of a cylindrical rotor made of a material and having a thickness which prevents the passage of neutrons therethrough. The rotor is spun so that when a slit or a system of slits in the rotor is in line with the beam path, a group of neutrons can pass through the slit to form a short burst of neutrons. At all other times the rotor acts as a shield and interrupts the beam. The neutrons in the beam traverse a flight path to a neutron detector which typically is a boron or lithium containing counter which generates electrical pulses promptly when neutrons strike it.

The faster neutrons in each burst reach the detector and produce electrical pulses before the slower neutrons do so. The electrical pulses are amplified and routed to a series of registers which are arranged to record at successive predetermined time intervals following the instant when the rotor slit is aligned with the collimator slot to produce a neutron burst. The number of pulses recorded in the various registers as a result of the receipt of one or of several neutron groups provides a signal which is indicative of the velocity distribution of the neutrons emerging from the reactor. To determine the neutron cross section of a material, a sample is placed in the beam path and the resulting velocity spectrum at the detector is compared with that produced in the absence of the sample.

This method presents certain problems however. Since some neutrons are detected even in the absences of the beam and other sources of noise may also be present in the system, ordinarily several bursts of neutrons must be utilized to optimize the signal-to-noise ratio of the resulting signal. Further, even if there were no background noise, the statistical variation in the number of neutrons detected in a given time interval would lead to statistical errors. The several bursts of neutrons which are utilized must be separated from each other in time by an amount greater than the time of travel of the slowest neutrons in order for the counting circuits to be properly related to the time of neutron burst production. Hence, a large number of neutrons in the emerging beam before modulation by the chopper are useless and wasted and the amount of time required to develop an adequate sample of the detected neutrons is considerable.

It is an important feature of the present invention to utilize a larger portion of the particles in such a beam by continuously modulating the density of the beam at a first point in accordance with a continuous applied signal rather than by interrupting the beam to produce widely separated neutron bursts.

As with the conventional method described above, the particles in the continuously modulated beam are detected at a second point which is a predetermined distance from the first point in the path of the beam and are utilized to produce electrical pulses which provide a received signal. The form of the received signal depends upon background particles detected and other sources of noise, on the form of the applied signal and on the velocity distribution of the particles in the beam. The received signal is then processed in a manner which depends on the form of the applied signal to produce a processed signal which is equivalent to the signal which would be produced by the conventional method using widely separated bursts of particles. The processed signal, like the signal produced by the conventional method, is indicative of the velocity distribution of the particles in the beam, but can be produced in a shorter time since a higher percentage of the beam particles are utilized. The method and apparatus are applicable to many types of particles and may be utilized with a variety of modulation and detection methods.

It is, therefore, an important object of the present invention to provide an improved method for determining particle velocities which is rapid and efficient in operation.

A further object of the invention is to provide a method and apparatus for measuring the velocity distribution of a particle beam which will utilize a large percentage of the particles in the beam.

A still further object of the invention is to provide improved apparatus for modulating a particle beam and for processing the signal resulting from detection of the particles.

Other objects and advantages of the present invention will become apparent from reference to the following description when taken in conjunction with the accompanying drawings in which:

FIG. 1 is a schematic illustration of the velocity measuring system of the present invention;

FIG. 2 shows three forms of applied signal which may be utilized with the invention;

FIG. 3 is a perspective view of a beam modulator utilized in practicing the invention;

FIG. 4 is a vertical cross-sectional view of the modulator shown in FIG. 3;

FIG. 9 is a schematic illustration of a signal processing apparatus utilized in practicing the invention; and FIG. 10 is a diagram showing the timing of the gates illustrated in FIG. 9.

In the following description the invention has been applied to energy spectrum measurement for neutrons. It is noted, however, that the invention can be applied equally as well to a large class of measurements with low energy and high energy neutrons, to elastic and inelastic scattering of neutrons and similarly with respect to the measurement of other types of particles of varying energies.

Figure 7:
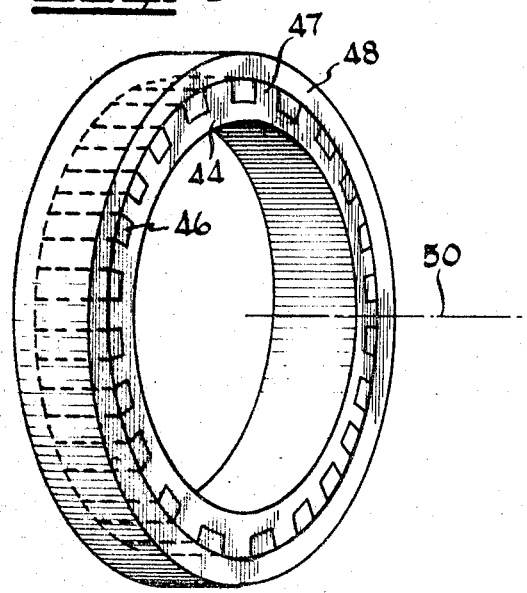
FIG. 7 is a perspective view of an alternative form of modulator.
Figure 8:
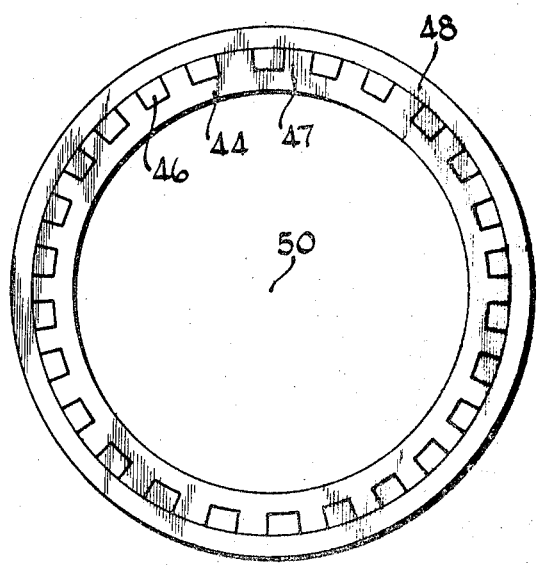
FIG. 8 is a side view of the modulator shown in FIG. 7.

As illustrated in FIG. 1 the velocity measuring system generally includes a particle source 10 which may be, for example, a nuclear reactor core which produces a large number of neutrons having various velocities in a suitable range of velocities, the distribution of which does not vary with time. The particles pass through a collimator 12 which forms them into a beam of particles traveling nearly parallel to one another. As shown in FIG. 1, the collimator 12 comprises a reactor shield 14 with an elongated slot 16 with or without solar slits. By absorbing or reflecting neutrons with paths not parallel to the sides of the slot or slit system 16, the collimator 12 causes the emerging neutrons to have generally parallel paths. At a first point, the beam passes through a beam modulator or neutron chopper 18 which varies the density of the beam in accordance with an applied signal. The position of the forms of beam modulator illustrated in FIGS. 3, 4, 5, and 6 is shown in solid lines in FIG. 1, while the position of the form of modulator illustrated in FIGS. 7 and 8 is shown in phantom. Detailed forms of preferred modulators and preferred signals will be described hereinafter.

The modulated beam travels along a beam flight path 22 to a particle detector 24 at a second point spaced from the first point. The detector produces an electrical pulse for each particle detected which is recorded to produce a received signal. It will be apparent that the received signal includes pulses produced by background particles and other sources of noise in the system, upon the form of the applied signal and upon the velocity distribution of the beam particles. The received signal is then processed by a signal processor 25 in a manner which is related to the form of the applied signal to reduce the effect of background particles and other noise and to produce a processes signal which is equivalent to the signal which would have been produced if the applied signal had been a plurality of widely separated bursts of particles. Connecting means 26 which includes a signal generator 27 between the beam modulator 18 and the signal processor 25 permit the applied signal the processed signal to be time related to one another to provide an indication of the velocities of the particles in the beam. The reference signal produced by signal generator 27 and applied to the signal processor 25 may be produced by any suitable means, for example by a separate slotted wheel which modulates a light beam in unison with the modulated neutron beam, or a wheel which periodically energizes a magnetic pickup in unison with the modulated neutron beam or by a particle detector operated in a current mode placed immediately after the neutron chopper 18 in such an arrangement that a roughly sinusoidal potential is generated in unison with the modulated neutron beam.

As previously indicated, a variety of applied signals and procedures for processing the received signals may be utilized. All, however, are continuously varying functions of time as contrasted with the widely separated bursts of particles of the prior art, thereby permitting a more efficient use of the particles produced by the source.

One highly useful form of signal comprises a plurality of wave trains, one of which is illustrated in FIG. 2A, each of which is transmitted at a respective substantially constant frequency for a time much longer than the travel time between the first and second points of the slowest of the particles. Another useful form of signal illustrated in FIG. 2B comprises a signal the frequency of which varies continuously over a time, the time being long in comparison to the travel time of the slowest of the particles between the first and second points. A still further useful form of signal is illustrated in FIG. 2C. The form of the modulated beam pulse affects the harmonic content of the signal. If the chopper is constructed in a manner to give essentially triangular shaped pulses, the pulse train is fairly rich in higher harmonic content, particularly the odd harmonics. If the sharpness of the peaks and valleys is blunted as a result of chopper construction, an essentially sinusoidal beam modulation is produced.

All of these forms of signals may be produced using the mechanical beam modulators which are disclosed herein. For ease and clarity of description, the novel beam modulators which can produce desirable signals are first described. Thereafter, systems for processing the signals and the methods of processing in accordance with the present invention are disclosed.

Turning first to the modulator 18, as shown in FIGS. 3, 4, 5 and 6, one form suitable for use with a neutron beam comprises a movable base 29 including a flat circular wheel 30 which is mounted on a shaft 31 for rotation about its axis in a plane perpendicular to the path of the beam emerging from the reactor. The wheel 30 is primarily formed of a material such as aluminum which is relatively transparent to neutrons and provides structural strength. The wheel includes a plurality of neutron absorber elements 34 circumferentially spaced around the periphery of the wheel. The shaft 31 of the wheel 30 is so positioned with respect to the absorber elements and the beam path 22 that the elements 34 intercept the beam emerging from the slot 16 as the wheel rotates about its axis. Preferably, the absorber elements 34 lie between two radii of the wheel with their outer side on the wheel circumference and their inner side on a line equidistant from the wheel axis so that the wheel 30 and elements 34 have the appearance of a toothed wheel construction wherein the absorber elements 34 and teeth 36 of a nonabsorbing material each have the shape of outer portions of radial sectors of a circle. The material used for the elements 34 will depend upon the energies of the neutrons of interest. Examples of several such materials will be described below in connection with a description of a specific embodiment.

Preferably the modulator 18 in the form of the above described wheel 30 functions in cooperation with a fixed grill or beam divider 37 mounted between the slot 16 and the wheel. The grill 37 comprises a plurality of grill neutron absorber elements 38 and neutron apertures 40. The grill 37 splits the emerging beam into a plurality of beams and also aids in modulating the beam in the desired manner. The absorber elements 38 and apertures 40 are preferably shaped like radial sectors of the wheel 30 and are positioned in the beam path so as to register with the wheel absorber elements 34 and teeth 36 as the wheel rotates. As a result of this arrangement a plurality of parallel beams are provided which are identically modulated in density by the rotation of the wheel 30.

In the illustrated arrangement the angular widths of the apertures 40 are the same or smaller than that of the teeth 36 on the wheel 30 so that a plurality of wave trains are produced which as shown in FIG. 2A are roughly triangular in shape and uniform in maximum amplitude. In the embodiment shown in FIGS. 3 and 4 all of the teeth 36 and absorber elements 34 have the same width. Hence, if the speed of rotation of the wheel 30 remains constant the frequency of the wave train is also constant and when the speed is increased the frequency increases. A long constant frequency waveform is shown in part in FIG. 2A which may be produced by rotating the wheel of FIGS. 3 and 4 at a constant speed. If the rotational speed is increased gradually the waveform shown in FIG. 2B will be produced by the wheel of FIGS. 3 and 4.

Figure 5:
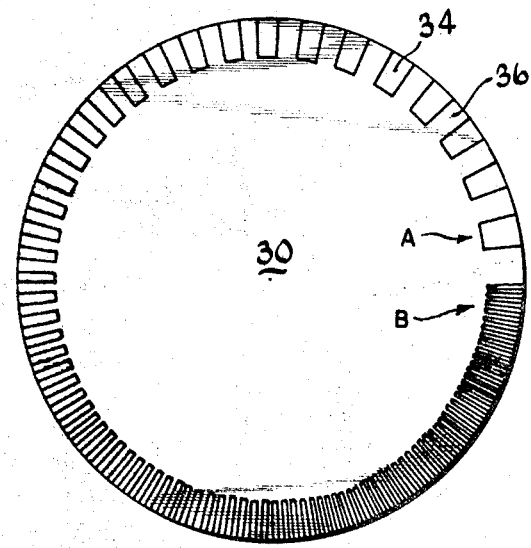
FIG. 5 is a diagrammatic plan view of another embodiment of the modulator shown in FIGS. 2 and 3.

Another form of wheel 30 is illustrated in FIG. 5 which is particularly useful for producing the waveform shown in FIG. 2C while rotating at a constant speed with a beam restricted in width to that of the narrowest element of the wheel in FIG. 5. It may be seen that the absorber elements 34 and teeth 36 are relatively wide, as indicated at A, gradually becoming narrower as one proceeds around the disc to the point B. The ratio of the width of the largest to the width of the narrowest element can be selected to suit the needs of the experimenter and is preferably greater than three. The angular velocity of the wheel determines the maximum and minimum frequencies and the total duration of the signal.

Figure 6:
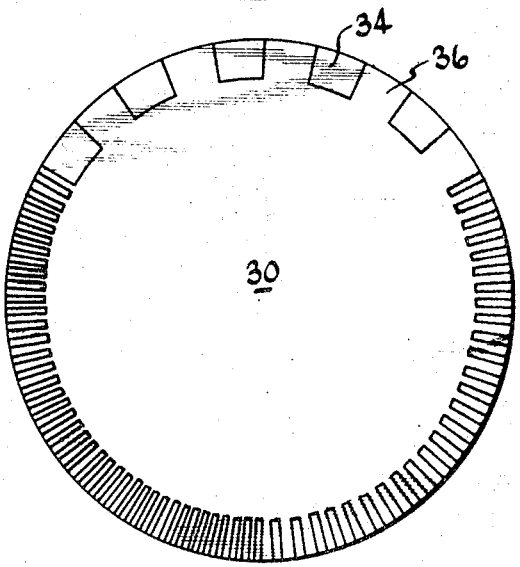
FIG. 6 is a diagrammatic plan view of still another embodiment of the modulator shown in FIGS. 2 and 3.

Still another form of wheel 30 is illustrated in FIG. 6. This form is particularly useful in producing a series of single frequency wave trains one of which is generally illustrated in FIG. 2A. In this form three sets of uniformly spaced teeth 36 and apertures 34 for producing three such wave trains are placed about the periphery of the wheel 30. One rotation at a single speed will produce three such wave trains while another rotation at another speed will produce three more of such wave trains at different frequencies.

When the wheel 30 has a form as shown in FIGS. 5 and 6 the beam divider or beam splitter 37 effectively uses a beam slot 16 which is no wider than the narrowest spacing in the wheel 30. When the wheel has a uniform spacing of chopper elements, the beam divider 37 may use an arbitrarily large fraction of the circumference of the wheel.

In a specific embodiment of the modulator as applied to neutrons shown in FIGS. 3 and 4 the wheel 30 is formed with an outer radius of 5.5 inches and has 120 teeth so that 120 cycles can be transmitted in each rotation of the wheel. The beam splitter 37 provides 15 beams. With these parameters, the cross-sectional area of the collimator slot 16 may be as much as 5.5 sq. in. When the wheel is rotated at 180 revolutions per second, each cycle produced has a period of approximately 45 microseconds. The neutron absorbing material for absorber elements 34 and 38 of the wheel 30 and the grill 37, respectively, is a layer of cadmium having a thickness of 0.040 in. In each case the cadmium is bonded between two one sixteenth in. layers 41 of aluminum which form the wheel teeth 36 and the grill apertures 40 as well as the central portions of the wheel 30. For strength and durability in operation, the laminated toothed structure of the wheel is encased in between two solid aluminum plates 42 having a combined thickness of 0.54 inches which are mounted on a rotor shaft.

It should be noted that this particular embodiment is useful only for modulating neutrons having essentially thermal or small epithermal energies. A thickness of cadmium of about 0.050 in. will allow passage of sufficiently energetic epithermal neutrons, i.e., those having energies above about 0.30 electron volts. In order to modulate neutron beams with neutrons having energies of as much as 1.0 electron volt the cadmium may be replaced by a powder of Boron- 10 or of $B_4C$ in a suitable epoxy resin. In either case the space for the neutron absorbing material is preferably formed by milling out an appropriately shaped volume from one of the two aluminum layers 41.

Another form of beam modulator is shown in FIGS. 7 and 8. In this embodiment the base 29 comprises an inner hollow cylinder 44 of a material which does not significantly absorb or scatter neutrons. The cylinder 44 is provided with alternating longitudinal channels 46 and ridges 47 of uniform width spaced around its outer circumference and is securely mounted in an outer cylinder 48 of a similar material such as aluminum which closes the open side of the channels. The channels 46 are each filled with a suitable neutron absorber such as Boron- 10 or $B_4$ C in an epoxy resin. The cylinders 44 and 48 are mounted on end plates which are attached to an axial shaft 50 for rotation about their axis which is positioned perpendicular to and intersecting the beam path 20. The interior of the cylinder is thus devoid of the axial shaft. When two diametrically opposed neutron absorbers are aligned with absorbers 38 in the beam splitter the beam can pass through the two cylinders 44 and 48. Otherwise, the beam is interrupted. It may be seen that the period of each cycle of the signal produced by this embodiment will be shorter than that produced by the previous embodiments given similar dimensions for the neutron absorber and similar rotation speeds, elements and the apertures therebetween since the corresponding ridges 46 on opposite sides of the cylinders 44 and 48 move in opposite directions. In the embodiment of FIGS. 7 and 8 it must be noted that the transit time of the neutrons across the cylinder must be considered if the cycle length of the modulated signal is comparable with or smaller than the transit time. By way of example, where the outer cylinder diameter is 11.12 inches, a neutron having an energy of 10.0 electron volts will have a transit time of 6.5 microseconds. If the period of each cycle of the transmitted signal is smaller than such transit time, such neutrons will leave the cylinder via a ridge which is not diametrically opposite to the ridge which it entered. For this reason this embodiment is not generally suitable for use with neutrons having energies less than 1.0 electron volt, though use can be made of this transit time in special cases to select desired energies of neutrons and eliminate some of the others.

Various forms of continuous applied signals and processing methods which may be utilized in order to produce a measurement of velocities equivalent to that made using separated individual bursts of particles will now be described. It has previously been noted that one form of signal which may be used is a plurality of successively applied substantially constant frequency wave trains which are at least as long as the travel time of the slowest of the beam particles. The particles are detected at the end of the beam path an used to produce electrical pulses the time distribution of which depends upon the applied signal and the velocity distribution of the particles. The pulses are counted in a plurality of counters which are open for respective predetermined periods of time, which are typically one-quarter the basic period of the applied signal, and processed to produce the phase and amplitude of the detected signal compared to the impressed signal. In one application of this technique the relative phases and amplitudes are computed and then used to synthesize the time distribution of the particles.

A signal processing system for performing this method of analysis for neutrons or other particles is shown in FIG. 9 in block form since the components thereof may be apparatus well-known in the art. Particles are detected by a particle detector 24 at the end of the beam flight path 22. As previously noted, if the particles are neutrons, a boron or lithium containing counter may be used such as a boron trifluoride proportional counter or a lithium loaded glass scintillation counter. A boron trifluoride proportional counter is highly efficient in detection at low energies (0.025 ev.) and is somewhat less efficient in detecting neutrons with higher energies.

The output of the particle detector is applied to an input of signal processor 25. A reference signal from reference signal generator 27 is also applied to signal processor 25. In one form of analyzing the data, a monitor detector is placed at the beginning of flight path 22 in addition to the particle detector 24 which is located at the end of flight path 22. Both apply separate inputs to separate signal processors 25 one of which is shown schematically in FIG. 9. Through the use of the signal processor 25 information is generated from which the relative phases and amplitudes of the detected signal at the end of flight path 22 may be determined. In any case, all particle signals are fed into signal processors 25 and analyzed with respect to the reference signal from signal generator 27.

In the signal processor the electrical pulses produced by the detector 24 are fed into a counting network. The counting network, as illustrated, comprises four counters or registers 56A, 56B, 56C, and 56D controlled by gates 58A, 58B, 58C, and 58D, respectively. Gates 58A—58D are adjusted to be repeatedly open for a time equal to one-half of the period of each cycle of the respective applied wave train which is of interest and closed for a similar time. This may be predetermined or may also be information obtained via the connecting means 26 and a gate generator 62. The timing of the gates, which should of course be adjustable since a plurality of frequencies are utilized, is such that the open time of each overlaps adjacent counters by one quarter cycle of the applied wave train. Thus, as illustrated in FIG. 10, gate 58A is open and counter 56A operative during time periods 1 and 2 which are each equal to one quarter cycle of the applied wave train. Gate 58B is open and counter 56B is operative during time periods 2 and 3. During time periods 3 and 4 gate 58C is open and counter 56C operative. Finally, during time periods 4 and 1, gate 58D is open and counter 56D is operative. Thus, it may be seen that the gates and counters labeled A and C are complementary to one another, as are the gates labeled B and D.

The modulator 18 is rotated a substantial number of times to accumulate a statistically satisfactory number of counts in each of the counters.

The cumulative counts in each of the counters resulting from each frequency are recorded and associated with the frequency in a recorder 60. This procedure is conducted for both the monitor particle detector placed at the beginning of the flight path 22 and for the particle detector at the end of the flight path 22.

With respect to the digital information from recorder 60, for the first and second positions, the differences in counts in pairs of complementary counters is indicative of the amplitude of the sine and cosine components of the signal. Both of these outputs are then processed by a computer 68 by means well-known in the art to provide a measure of amplitude and phase or a measure of the amplitudes of the sine and cosine components of the signal as a function of frequency. Thereafter, the computer 68 converts this function into a measurement of neutron intensity as a function of time of travel or velocity, this being the velocity distribution of the neutrons, the desired measurement. This result may be recorded on a recorder 70.

Other methods of treating the data, similar in principle but differing in some details, are possible when the modulated beam has an appreciable content of higher harmonics. Specifically, by increasing the number of gating channels 58 and registering channels 56 beyond the four shown in FIG. 9 to the number appropriate for the desired higher harmonic, it becomes possible to process the recorded data to provide not only the fundamental but also the higher order harmonic content. The synthesis of the resulting data results in better resolution than would occur if only four channels are used.

Another method and system of signal processing may be used with an applied signal having a continuously varying frequency and a duration many times longer than the travel time (T) of the slowest of the particles between the modulator and the detector. As previously noted, such a signal is illustrated in FIG. 2B and may be produced by rotating the modulator of FIG. 3 at a constantly changing speed. The signal processor 25 is as described above. The difference in procedure is that during the time during which the data is being collected the modulated beam is slowly changing its frequency by an amount $\Delta f$ whereas in the above described system, the modulated beam had a constant frequency during the individual data collection times. In the system which permits a slowly changing modulator frequency the results are essentially the same as for a series of constant speeds as long as the variation in modulator frequency during a data collection period is such that value of $2\pi \Delta f T$ is smaller than approximately one-tenth (0.1). Application of this principle permits the modulator to be operated during data collection either such as to yield a series of pulse trains each with fixed frequencies allowed to vary in the interal$\Delta f$ or at a constantly changing modulator frequency adjusted so that $2\pi \Delta f T$ is less than approximately 0.1 during the individual collection times.

Still another method and system of signal processing may be used with an applied signal having a continuously varying frequency and a duration at least as long as the travel time of the slowest of the particles between the modulator and the detector. As previously noted, such a signal is illustrated in FIG. 2C and may be produced by rotating the modulator of FIG. 5 at a constant speed. The signal processor in such a system includes a large number of sequentially operative registers. The triggering time from the start of operation may be controlled by a signal generated once each cycle by the chopper modulated train produced by the rotating chopper wheel. The received signal resulting from registration of the pulses produced by the second detector may be correlated with the received signal at the first (monitor) detector located at the beginning of flight path 22. The use of correlation techniques to determine travel times is well known and need not be set forth in detail herein. The use thereof in connection with seismic signals is described in the patent to Doty, et al., No. 2,688,124.

Still another method of signal processing may be utilized in connection with an applied signal comprising a plurality of relatively short waves, each having a respective substantially constant frequency. Such waves may be produced by rotating the wheel 30 of FIG. 6 at one or several successive speeds. The signal processor with this method also includes a large number of sequentially operated registers as in a time of flight analyses. The received signal resulting from registration of the pulses produced by the detector may be processed by a matched filter in a manner similar to that disclosed in copending application Ser. No. 631,267, filed Apr. 17, 1967, now U.S. Pat. No. 3,404,400, entitled "Signalling Method and Apparatus," by Park H. Miller, Jr., to produce a time of flight distribution of the neutron flux.

Certain features of the expected velocity distributions affect the requirements for data collection and data processing. These concern the determination of the number of frequencies at which data are collected, the upper frequency and lower frequency at which data are recorded, the range $\Delta f$ permitted for each frequency and the application of filtering. If the expected data consist of a continuously and relatively slowly varying velocity distribution, then only a modest number of frequencies is required, a value $\Delta f$ in each frequency is permitted as described before, a modest value for $f_{max}$ is required and the value of $f_{min}$ should be small. If a narrow peak or peaks occur in the above described distribution whose width is of the order $\Delta t$, then the maximum frequency, $f_{max}$, to be selected should be at least of the order $f_{max} \sim \frac{1}{\Delta t}$ if the data are to reproduce these narrow peaks essentially unbroadened by resolution. If the expected distribution consists primarily of relatively isolated narrow peaks (perhaps approaching delta functions), the synthesized distribution provided by the signal processor 25 and computer 68 will consist of the expected peak or peaks but will have spurious side lobes as well as a spurious negative undershoot between peaks. The spurious negative values will be minimized by making $f_{min}$ approach zero. The width at the base of the fundamental peak (s) is governed by $1/f_{max}$; consequently, $f_{max}$ should be made large. With any practical upper frequency, the synthesized distribution for one or more sharp peaks will have side lobes which can be significantly reduced by Wiener filtering, described on page 20 through 23 of "Selected Papers of Norbert Wiene," 1964, MIT Press, applied either in the time or frequency domain. Such filtering is unnecessary for the smoother velocity distributions described above.

Various changes and modifications could be made in the above method and apparatus for determining velocities. For example, particles other than neutrons could be utilized and electronic means of modulation would be appropriate in some cases.

The modulator can be designed to produce a modulated beam especially rich in harmonic content since a method of analyzing the data is described which retrieves the additional information from the detected signal. The invention can be utilized in determining nuclear cross sections, whether absorption or scattering. It can be used in mass spectrometry where velocities are indicative of mass and in analyses where velocities are indicative of temperature or of crystal structure. All of these fall within the scope of the invention as set forth in the following claims.

We claim:

1. A method of determining the velocity distribution of a plurality of particles comprising the steps of producing a beam of said particles, varying the particle density of said beam in accordance with a continuous applied signal at a first point in the path of said beam thereby producing a modulated beam, detecting particles in the modulated beam at a second point a predetermined position following said first point in the path of said beam to produce a received signal comprising a plurality of pulses the time distribution of which is related to said applied signal and to said velocity distribution, said continuous applied signal comprising a plurality of applied wave trains, each of said wave trains being applied at a respective substantially constant frequency for a time at least as long as the travel time of the slowest of said particles between said first point and said second point and processing said received signal in accordance with said applied signal to produce a processed signal indicative of the velocity distribution of said plurality of particles.

2. A method in accordance with claim 1 wherein the processing of said received signal includes comparing the phase of each of said received wave trains with the phase of the corresponding applied wave train to detect the relative phase thereof, and by recording each such relative phase associated with the frequency of said applied wave train.

3. A method in accordance with claim 2 wherein the processing of said received signal includes comparing the amplitude of each of said received wave trains with the amplitude of each of said applied wave trains to detect the relative amplitude thereof, and by recording each such relative amplitude associated with the frequency of said applied wave train.

4. A method in accordance with claim 2 wherein the processing of said received signal includes comparing the phase of each of said received wave trains with the phase of the corresponding applied wave train to detect the relative phase thereof, recording each such relative phase associated with the frequency of said applied wave train, comparing the amplitude of each of said received wave trains with the amplitude of each of said applied wave trains to detect the relative amplitude thereof, and recording each such relative amplitude associated with the frequency of said applied wave train.

5. A method of determining the velocity distribution of a plurality of particles comprising the steps of producing a beam of said particles, varying the particle density of said beam in accordance with a continuous applied signal at a first point in the path of said beam thereby producing a modulated beam, detecting particles in the modulated beam at a second point a predetermined position following said first point in the path of said beam to produce a received signal comprising a plurality of pulses the time distribution of which is related to said applied signal and to said velocity distribution, said continuous applied signal comprising a wave train having a continuously varying frequency and a duration at least as long as the travel time of the slowest of said particles between said first point and said second point and processing said received signal in accordance with said applied signal to produce a processed signal indicative of the velocity distribution of said plurality of particles.

6. A method of determining the velocity distribution of a plurality of particles comprising the steps of producing a beam of said particles, varying the particle density of said beam in accordance with a continuous applied signal at a first point in the path of said beam thereby producing a modulated beam, detecting particles in the modulated beam at a second point a predetermined position following said first point in the path of said beam to produce a received signal comprising a plurality of pulses the time distribution of which is related to said applied signal and to said velocity distribution, said transmitted signal comprising a plurality of applied wave trains with respective different substantially constant frequencies having substantial limited durations, and a total duration of at least as long as the travel time of the slowest of said particles between said first and second points and processing said received signal in accordance with said applied signal to produce a processed signal indicative of the velocity distribution of said plurality of particles.

7. A method in accordance with claim 6 wherein the processing of said received signal includes applying it to active filter means tuned to the respective frequencies of said applied wave trains to produce a separate filtered wave train corresponding to each of said applied wave trains and combining said filtered wave trains in selected time relationships, said selected time relationships being such that the filtered wave trains which would be produced if the beam had not travelled between the first and second points would be substantially all in phase during the respective cycles of the filtered wave trains corresponding to the selected cycles of the applied wave trains.

8. Apparatus for continuously modulating the density of a beam of particles in accordance with a continuous signal comprising a cylinder mounted for rotation about an axis perpendicular to the path of said beam and so positioned that the path of said beam intercepts the circumference of said cylinder at two points, beam interrupting means comprising a plurality of elements extending longitudinally of said cylinder, positioned in spaced apart relationship around the circumference of said cylinder and adapted to absorb particles in said beam and means for rotating said cylinder so as to move said plurality of elements successively across beam in accordance with a predetermined program whereby the density of said beam is modulated in accordance with said continuous signal.

9. Apparatus for continuously modulating the density of a beam of particles in accordance with a continuous signal comprising a wheel mounted for rotation about an axis parallel to the path of said beam, and so positioned that the periphery of said wheel intercepts the beam path, a plurality of spaced elements positioned on the periphery of said wheel and adapted to absorb particles in said beam and means for rotating said wheel so as to move said plurality of elements successively across said beam in accordance with a predetermined program whereby the density of said beam is modulated in accordance with said continuous signal including a beam divider disposed in the path of said beam ahead of said wheel, said beam divider comprising a grill formed of a material adapted to absorb beam particles and defining a plurality of apertures through which said beam can pass so that the beam is divided into a plurality of parallel beams, said apertures being so positioned relative to said wheel that said particle absorber elements are registrable with said apertures.

10. Apparatus in accordance with claim 9 wherein the area of said particle absorber elements on said wheel are larger than the area of said apertures in said grill.

11. Apparatus in accordance with claim 9 wherein said particle absorber elements and the spaces therebetween are all of the same angular width so that the frequency of said signal depends directly upon the speed of rotation of said wheel.

12. Apparatus in accordance with claim 9 wherein the angular widths of successive particle absorber elements and the spaces therebetween gradually increase around said wheel so that the frequency of said signal depends in part on said angular widths.

13. Apparatus in accordance with claim 9 wherein said wheel comprises a plurality of sectors in each of which the particle absorber elements and the spaces therebetween all have the same angular widths different from the widths of said elements in other sectors.